Feb. 13, 1934.  R. C. WALTON ET AL  1,947,072
EXPANSION JOINT
Filed Oct. 19, 1932
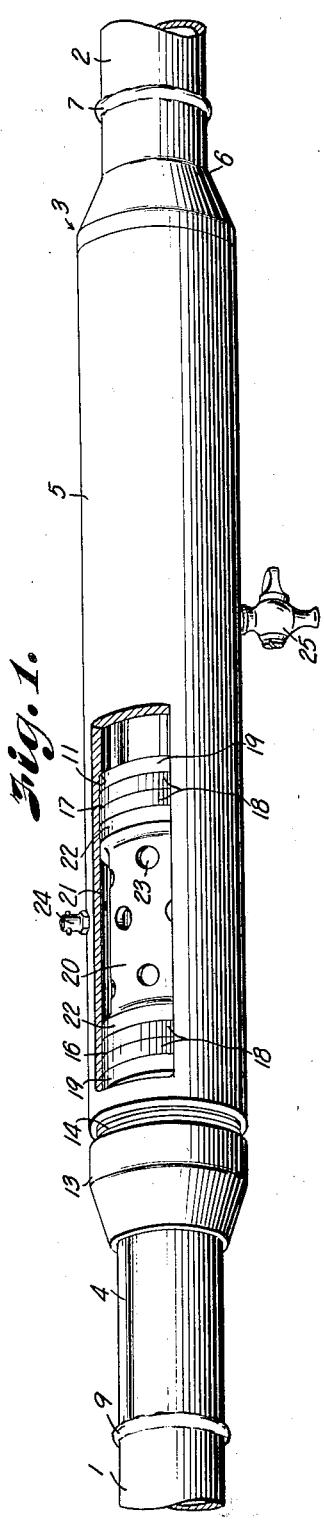
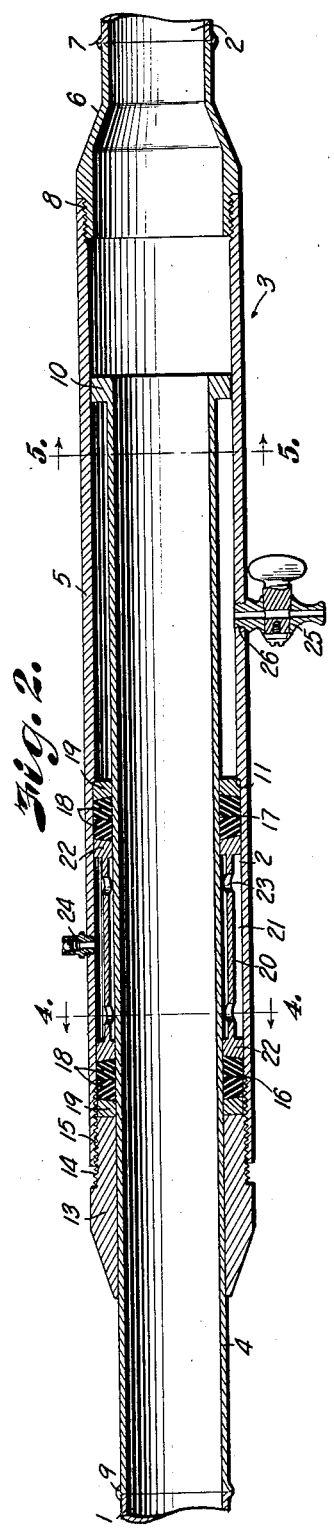
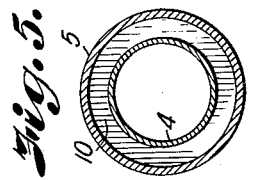
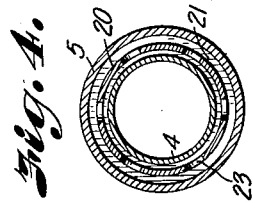
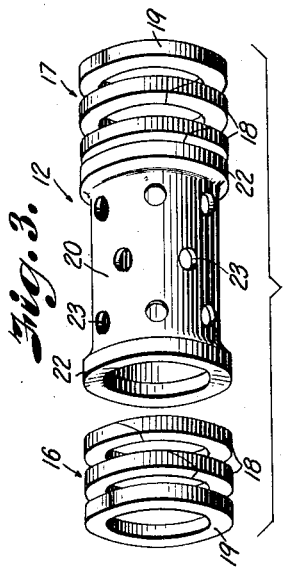
INVENTORS
R. C. Walton
H. T. Gudgen
BY
ATTORNEY Patented Feb. 13, 1934

1,947,072

UNITED STATES PATENT OFFICE 1,947,072

EXPANSION JOINT

Robert C. Walton and Herbert T. Gudgen, Coffeyville, Kans.

Application October 19, 1932. Serial No. 638,545

4 Claims. (Cl. 285—162)

Our invention relates to expansion joints and more particularly to a device of that character adapted to be interposed in oil, gas and other pipe lines.

In order to permit expansion and contraction of pipe lines in accordance with temperature changes, it is necessary to insert expansion joints or provide expansion couplings at intervals in the lines. While such joints must allow relatively free longitudinal movement of adjacent pipe sections independently of each other they must effectively seal against leakage from the line through the joint.

The principal objects of our invention are to provide an expansion joint that can be readily interposed in a conduit and serve as a union or removable coupling to facilitate inspection and cleaning of the line and that will permit longitudinal movement of adjacent pipe sections relative to each other without leakage of fluid from the line.

In accomplishing these and other objects of our invention, we have provided improved details of structure, the preferred form of which is illustrated in the accompanying drawing, wherein:

Fig. 1 is a perspective view of adjacent pipe sections connected by an expansion joint constructed in accordance with our invention, a portion of an outer telescoping member being broken away for better disclosure of other parts.

Fig. 2 is a central, longitudinal section through the joint.

Fig. 3 is a perspective view of a spacing sleeve and packing rings in spaced relation.

Fig. 4 is a cross section on the line 4—4, Fig. 2.

Fig. 5 is a cross section on the line 5—5, Fig. 2.

Referring more in detail to the drawing:

1 and 2 designate aligned conduit sections connected by an expansion joint embodying my invention and generally designated 3.

The expansion joint includes inner and outer telescoping members 4 and 5, the outer member or barrel 5 being preferably secured to one conduit section by a swedge coupling 6 having its opposite ends respectively welded to the conduit as indicated at 7 and threadedly connected to one end of the barrel as shown at 8. The tubular inner member 4, having its outer end fixed to the other conduit section by welding or the like 9, is adapted to telescope in the barrel and is provided on its inner end with an outwardly directed flange 10 concentrically spacing the inner and outer members and serving as a stop wall for a purpose later to be described.

In order to prevent leakage of fluid from the line through the joint the free end of the barrel is counterbored to form a stop shoulder 11 and a sealing assembly 12 is inserted between the inner and outer members and forced to seating engagement with the stop shoulder by a packing nut 13 having external threads 14 engaging internal threads 15 of the barrel.

It is desirable, for the purpose of reducing friction and wear of the device, to continuously lubricate the portion of the tubular member sliding through the packing nut and we have, therefore, provided a pair of packing ring groups 16 and 17, each preferably comprising two rings 18 of flexible packing material and a single metal ring 19, and have spaced the groups by a sleeve 20 to form a lubricant chamber 21 between the packing and inner and outer telescoping members.

The sleeve 20 is held in concentrically spaced relation with the inner and outer line members by enlarged ends or heads 22 conforming in cross section substantially to the metal rings 19, the heads being preferably formed integrally with the sleeve and the flexible rings being mounted between the heads and the metal rings as clearly shown in Fig. 2.

Perforations 23 are further provided in the sleeve so that lubricant admitted into the chamber 21 through a suitable valve fitting 24 in the barrel can flow over the outer surface of the tubular member which is preferably polished to reduce resistance to the telescoping movement of the members.

A drain cock 25 may be threaded into an opening 26 of the barrel for draining the joint.

Assuming an expansion joint to be constructed and interposed in a pipe line as described, its operation would be as follows:

Upon expansion or contraction of the line the joint members telescope correspondingly, longitudinal movement of the joint members due to contraction being limited by abutting engagement of the flange 10 with the metal ring of the group 17. With lubricant in the chamber 21 the polished outer surface of the inner joint member will be continuously lubricated to maintain the flexible packing rings pliable and to form a liquid seal for preventing escape of fluid through the joint. As will be apparent, the flexible packing rings can be expanded radially to more intimate contact with the inner and outer joint members by threading the packing nut into the barrel 5.

If the pipe line is used for conducting gas, water may collect in the barrel and can be easily drained therefrom through the cock 25.

For inspection and cleaning of the line the barrel may be readily unthreaded from the swedge coupling to disconnect the conduit and provide access to the line sections.

What we claim and desire to secure by Letters Patent is:

1. An expansion joint including an outer tubular member, an inner tubular member slidable in the outer tubular member and of smaller diameter to form an annular space therebetween, a packing stop means fixed relatively to one of the tubular members and slidable relatively to the other of said members, a packing element in said space and seated against said stop means, a second packing element in the annular space, means spacing said packing elements to provide an annular lubricant-containing chamber therebetween protected against leakage of a fluid thereinto from the interior and exterior of the expansion joint by said packing elements, means for supplying lubricant to said chamber, and a compressing element adjustably fixed to the tubular member which fixes said packing stop means to compress said packing elements into sealing relation with said tubular members.

2. An expansion joint including an outer tubular member, an inner tubular member slidable in the outer tubular member and of smaller diameter to form an annular space therebetween, a packing stop means fixed relatively to one of the tubular members and slidable relatively to the other of said members, a packing element in said space and seated against said stop means, a second packing element in the annular space, means spacing said packing elements to provide an annular lubricant-containing chamber therebetween protected against leakage of a fluid thereinto from the interior and exterior of the expansion joint by said packing elements, means for supplying lubricant to said chamber, a compressing element adjustably fixed to the tubular member which fixes said packing stop means to compress said packing elements into sealing relation with said tubular members, and a spacing collar on the member which is slidable relatively to said packing stop means and spaced from the packing elements to retain the tubular members in concentric alignment.

3. An expansion joint including an outer tubular member, an inner tubular member slidable in the outer tubular member and of smaller diameter to form an annular space therebetween, a packing stop means fixed relatively to the outer tubular member, a packing element in said space and seated against said stop means, a second packing element in the annular space, means spacing said packing elements to provide an annular lubricant chamber therebetween protected against leakage of fluid thereinto from the interior and exterior of the expansion joint by said packing elements, means for supplying lubricant to said chamber, and a compressing element adjustably fixed to the outer tubular member to compress and expand said packing elements into sealing relation with the tubular members.

4. An expansion joint including an outer tubular member, an inner tubular member slidable in the outer tubular member and of smaller diameter to form an annular space therebetween, a packing stop means fixed relatively to the outer tubular member, a packing element in said space and seated against said stop means, a second packing element in the annular space, means spacing said packing elements to provide an annular lubricant chamber therebetween protected against leakage of fluid thereinto from the interior and exterior of the expansion joint by said packing elements, means for supplying lubricant to said chamber, a compressing element adjustably fixed to the outer tubular member to compress and expand said packing elements into sealing relation with the tubular members, and a spacing collar fixed to the inner end of the inner tubular member and slidably engaged with the outer tubular member in spaced relation with the packing stop means to retain the tubular members in sliding concentric alignment.

ROBERT C. WALTON.
HERBERT T. GUDGEN.